June 23, 1931.  J. BOYLE  1,811,606
GRAIN RETARDER
Filed March 26, 1929
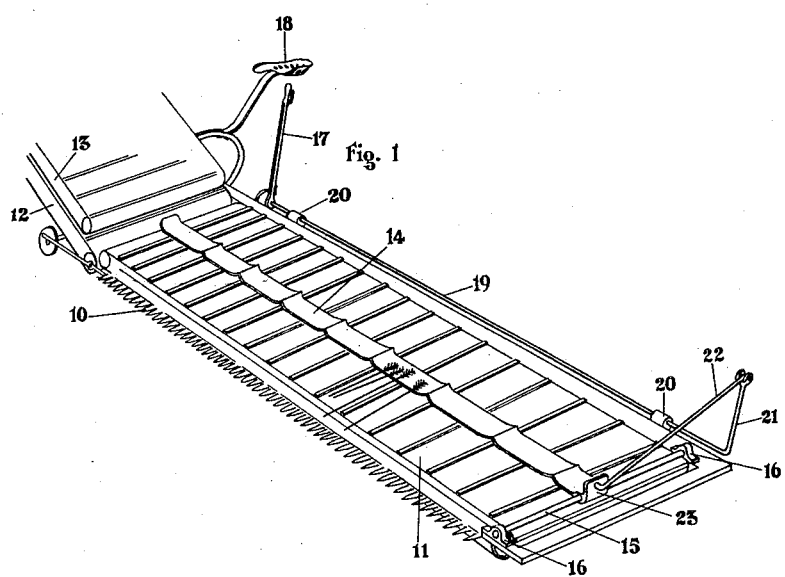
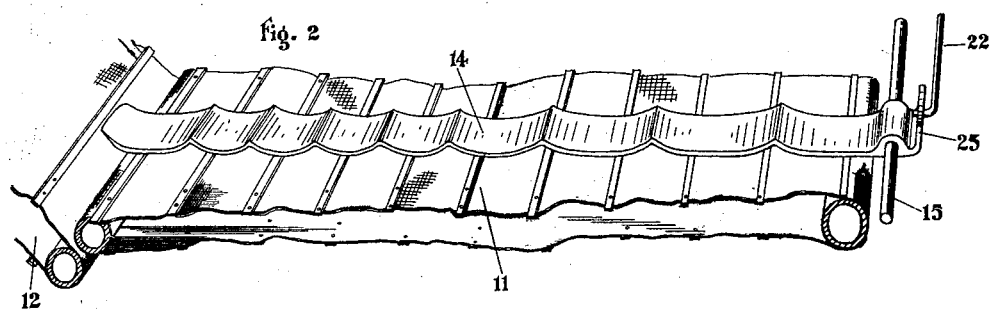
John Boyle Inventor
By Emil F. Lange
Attorney Patented June 23, 1931

1,811,606

UNITED STATES PATENT OFFICE

JOHN BOYLE, OF SCRIBNER, NEBRASKA

GRAIN RETARDER

Application filed March 26, 1929. Serial No. 349,996.

My invention relates to grain retarders for grain binders and its object is the provision of a device for maintaining the grain stalks in transverse relation to the platform throughout their entire movement to the elevating conveyor.

An important object of the invention is the design of a grain retarder for progressively increasing the retardation of the heads of the grain during the movement of the grain from the free end of the platform to the elevating conveyors.

Another object which I have in view is the provision of adjusting mechanism whereby the heads of the grain must fall on the retarder regardless of the variation in length of the grain stalks.

Another important object is the arrangement of the adjusting mechanism for the grain retarder so that the adjustment may be made instantly from the driver's position without stopping the travel of the machine.

It is also my object to provide a grain retarder with adjusting mechanism of such design that it may be installed as an accessory on any of the binders at present in use or which may be furnished with the binder as a built-in part.

Having in view these objects and others which will be pointed out in the following description, I will now refer to the drawings, in which Figure 1 is a view in perspective of my grain retarder in position on the binder platform and showing the relation between the grain retarder and the binder platform and the elevating conveyors.

Figure 2 is a view in somewhat enlarged scale showing the grain retarder in its relation to the binder platform and the lower elevating conveyor.

The binder is the usual grain binder. It has a cutter 10 immediately in front of a horizontal platform 11, the platform usually consisting of an endless canvas belt having transverse slats for carrying the grain on the upper run thereof toward the elevating conveyor which consists of upper and lower conveyors 12 and 13. The grain cut by the sickle 10 is thrown on to the canvas by a rotating reel (not shown). This grain is thrown with the butts of the stalks on the edge of the conveyor 12 nearest the sickle 10, the position of the heads depending on the length of the stalks. In theory the slats of the conveyor 11 should maintain the grain in transverse relation until the grain reaches the elevating conveyors. It is important that the grain be delivered to the elevating conveyors in transverse position as otherwise it will reach the bundle former in such a way that no perfect bundle can be formed. If the grain is inclined very much from the transverse position, it is apt to wind around the upper rollers of the elevating conveyor and to clog up and to stop the machine. Even when it does not clog the machine the grain is apt to be thrown out in the form of loose balls instead of in the form of bundles.

As a matter of fact the heads of the grain, being heavier than the butts, travel faster than the butts and if the conveyor 11 is of any considerable length, the grain is sure to assume an inclined position before it travels very far on the platform 11. I have therefore provided a grain retarder 14 extending the entire length of the platform 11 so as to adapt it to deliver all of the grain to the elevating conveyors. This retarder is preferably in the form of a strap having a plurality of ridges, the distances between ridges decreasing progressively from the free end of the platform to the elevating conveyors. The reason for this is that the inner end of the platform canvas carries not only the grain which is cut immediately in front of that end but it carries also all of the other grain which has been cut. On account of the greater load at the inner end of the platform, it is necessary to provide greater retardation at this point. The end portion of the retarder is almost in contact with the lower elevating canvas 12 and it is turned up at such an inclination as to deliver the grain directly to the elevating conveyors. The retarder is pivotally connected at its outer end so that it rests throughout its major portion on the slats of the platform conveyor 11. The retarder is so positioned that the heads of grain fall on the retarder and the movement of the slats of the platform conveyor 11 is such as to cause considerable vibration in the retarder 14. The butts are carried forwardly by the slats of the platform conveyor 11 but the heads are retarded by the ridges of the retarder. The heads are carried over the ridges by the combined action of the drag of the slats on the butts and the vibration of the retarder which causes the heads to jump up and down during the movement of the platform conveyor 11. The important features of the retarder are that its length is equal to the full length of the platform conveyor 11 and that the retarder has progressively decreasing distances between ridges.

Grain is seldom uniform in height and in some fields there is considerable variation in the length of the stalks. If the retarder 14 were fixed in one definite position, much of the grain would fall with its heads at one side or the other of the retarder and thus defeat the purposes of the retarder. This variation in the length of the grain stalks is so great that at times the retarder should be adjusted every few minutes. This is especially true on rolling ground where the grain stalks are very short on side hills and exceedingly long in the bottom portions of the field. To make the retarder 14 adjustable forwardly and rearwardly, I secure it at its outer extremity to a guide rod 15 which in turn is secured at its extremities in apertured ears 16 projecting upwardly from the frame of the platform. In this manner the retarder 14 is slidable on the rod 15 so that it may be adjustably positioned either forwardly or rearwardly. To make this adjustment really effective during the operation of the binder I provide a lever 17 adjacent the driver's seat 18. The lever is secured to a shaft 19 which is journalled in the ears 20 projecting rearwardly from the platform. The shaft 19 is provided with an arm 21, and a link 22 extends from the free end of the arm 21 to the upturned ear 23 of the retarder. It will be evident that the movement of the lever 17 will rock the arm 21 to impart forward and rearward movement to the ear 23 and consequently to the retarder 14. The lever 17 is not provided with a ratchet or similar device as there is no tendency for the retarder 14 to move either forward or backward except by the actuation of the lever 17. There is, of course, a vibration which might cause a slight shifting of the retarder 14 but this is amply taken care of by the friction in the bearings 20 but this may be supplemented by means of additional friction devices either on the lever 17 or on the shaft 19.

I am aware that other grain retarders have been known for a number of years. The most commonly used of these consists of a flat strap which is loosely positioned over a portion of the platform canvas. Others have been corrugated uniformly throughout their length but they also extend over only a portion of the canvas. The defect with practically all of the prior grain retarders is that they were not designed for use with the large binders which are at present coming into extensive use. The old horse-drawn binders were provided with a six-foot cutter and a platform of the same length. In those binders the grain was carried to the elevating conveyors without serious inclination. Many of the present binders, however, have sickles and platforms which are ten or more feet in length, these being usually drawn by tractors. In such binders the inclination which is not serious in the first six feet, becomes greatly magnified in the last four or more feet so that much of the grain is delivered lengthwise or almost so to the elevating conveyors. With my grain retarder, however, the stalks of grain are maintained in parallel relation transverse of the platform conveyor 11 and they are delivered in this position to the elevating conveyors. This action is insured by the fact that the retarder extends the full length of the platform conveyor and that the retardation is progressively increased. The operator of the binder has merely to watch the grain immediately ahead of him and to vary the position of the retarder 14 in accordance with the length of the grain which he is cutting and without stopping the binder.

Having thus described my invention in such full, clear, and exact terms that its construction and operation will be readily understood by others skilled in the art to which it pertains, what I claim as new and desire to secure by Letters Patent of the United States is:

1. A grain retarder for binder platforms, said grain retarder comprising a strap having a length substantially equal to the length of the binder platform, said grain retarder being provided with a plurality of spaced ridges throughout its length, the distances between successive ridges decreasing from the outer extremity toward the inner extremity of said grain retarder, and means at the outer extremity of said grain retarder for pivotal connection with the frame of the binder platform at the outer extremity thereof.

2. A grain retarder for binder platforms, said grain retarder comprising a strap having a length substantially equal to the length of the binder platform, said grain retarder being provided with a plurality of spaced ridges throughout its length, the distances between successive ridges decreasing from the outer extremity toward the inner extremity of said grain retarder, and manually operable means for varying the position of said grain retarder to compensate for the different lengths of the grain stalks.

In testimony whereof I affix my signature.

JOHN BOYLE.